Patented July 22, 1952

2,604,483

UNITED STATES PATENT OFFICE 2,604,483

ORGANO-TIN COMPOUNDS

Gerry P. Mack, Jackson Heights, and Emery Parker, New York, N. Y., assignors to Advance Solvents & Chemical Corporation, New York, N. Y.

No Drawing. Application January 9, 1950, Serial No. 137,676

10 Claims. (Cl. 260—429)

The invention relates to organo-tin compounds.

We have found that organo-tin halides react in the presence of alkali with organic compounds having an activated methylene group. Compounds are formed of the formula (1) $$R_nSnCR^1R^2{}_m^3$$

wherein R is an alkyl or aryl group, $R^1$ is hydrogen, alkyl or aryl, $R^2$ and $R^3$ are the same or different negative activating groups, for instance groups containing a carbon-oxygen double bond, a carbon-nitrogen triple bond, an $SO_2$ group or a system of conjugated double bonds; $n$ and $m$ are integer numbers and $n+m$ is always 4.

The reaction of organo-tin halides with organic compounds having activated methylene groups opens up an entire field of new organo-tin compounds which may find various technical uses, e. g. as stabilizers for halogen-containing resins, as additives to lubricants, and others.

Methylene groups are activated by at least two negative groups attached to the carbon atom of the methylene group. Such negative groups are, for instance: the carboxyl group COOH, the carbonyl group CO, the nitrile group CN, the sulphone group $SO_2$, the nitro group $NO_2$, the nitrosyl group NO, double bonds —C:C—, conjugated double bonds —C:C—C:C—, triple bonds, conjugated hydrocarbon rings. The activating groups may comprise two negative groups of the same or similar constitution or different groups. Compounds in which the methylene group is activated by two equal or similar negative groups are, for instance, malonic esters, beta-diketones, disulphones. Examples of compounds where the methylene group is activated by two different negative groups are, for instance, keto-sulphones, beta-keto-carboxylic acid derivatives, aryl benzyl cyanides, aryl alkyl ketones, aryl acetic acids, cyanoacetic esters, and many others.

Active methylene groups attached to aromatic or cyclomatic double bond systems, such as in cyclopentadiene, indene, fluorene, triphenyl methane and others, can also be reacted with organo-tin halides and form the corresponding substituted dialkyl or diaryl, trialkyl or triaryl tin derivatives of these hydrocarbons.

In order to have the invention better understood, we will discuss more in detail the reaction of compounds as defined hereinbefore with organo-tin halides. Since there are many organic compounds which contain an activated methylene group and which fall within the generic disclosure of our invention, we shall not attempt to list them all. We give, however, in the following description several groups of such compounds and list in each group representative members of the group which can be used to form products of our invention. We shall then describe examples illustrating the reaction by which the new compounds are obtained.

Organo-tin halides suitable for the reaction are, for instance, dimethyl, diethyl, dipropyl, dibutyl, diamyl, dihexyl, dioctyl, dilauryl, dibenzyl, diphenyl, ditolyl, and other dichlorides or dibromides as well as the corresponding trialkyl and triaryl monohalides.

As an alkaline condensing agent, we prefer to use a low molecular weight alkali metal alcoholate, such as sodium methoxide, sodium ethoxide, sodium isopropoxide, but the alkali metals themselves, also the alkali hydrides, in the finely distributed form may be used with equal success. The reaction is preferably carried out in an inert anhydrous solvent, e. g. an aromatic hydrocarbon such as benzene, toluene or xylene, or anhydrous alcohols or ethers, which do not interfere with the reaction. The presence of water has to be avoided because it would produce undesired side reactions and a partial hydrolysis of the organo-tin halides. For the same reasons, the reaction mixture should be protected against the hydrolyzing influence of moisture.

It is of course possible to prepare in each instance first the alkali metal derivative of the compound containing the active methylene group and to react then this isolated alkali metal compound with the organo-tin halide. However, this would constitute an unnecessary complication of the process and it is fully sufficient to condense the reacting compounds under conditions in which the alkali metal derivative is formed in solution as an intermediate product.

The first group of compounds in which a methylene group is activated by two neighboring carboxyl groups is represented by malonic esters, such as methyl, ethyl, propyl, butyl, 2-ethylhexyl, benzyl, cyclohexyl, tetrahydrofurfuryl, and other malonates.

When the sodium derivatives of these esters are reacted with dialkyl or diaryl tin halides in a suitable solvent under complete exclusion of water, compounds of the following formula are obtained.

(2) $$R_2Sn(CR'(COOR'')_2)_2$$

With trialkyl or triaryl tin halides the reaction products have the following formula:

(3) $$R_3SnCR'(COOR'')_2$$

In both formulae R is alkyl or aryl, R' is hydrogen, alkyl or aralkyl, and R'' is the residue of the aliphatic, aromatic, or alicyclic alcohol which had been used for the esterification of the carboxyl groups of the malonic acid.

It will be understood that in this and in succeeding structural formulae and equations applicants are merely giving what they believe to be the reactions and structures of the resulting products. It is intended that the specification and claims shall protect the products of the reactions, even though the precise structures of such products may later be shown to be other than those indicated in this specification.

Other malonic ester type compounds capable of reacting with organo-tin halides are compounds obtained by reacting malonic esters as listed hereinbefore with aldehydes, such as formaldehyde, acetaldehyde, butyraldehyde, benzaldehyde, and others, in the presence of a secondary amine, such as, piperidine or diethylamine. These compounds have the formula

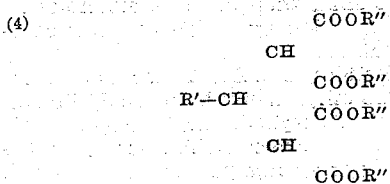

(4)

When reacted with organo-tin halides they produce compounds of the Formulae 2 and 3 where R' is the alkylene or arylene residue from the aldehyde used in the condensation, or hydrogen, if formaldehyde was used.

Still other malonic ester derivatives which are suitable for the reaction with organo-tin halides are obtained by condensing malonic esters with unsaturated compounds having activated double bonds, such as methyl vinyl ketone, ethyl acrylate, acrylonitrile, and others.

Organo-tin malonic ester compounds as defined by the Formulae 2 and 3 are liquids having a low vapor pressure and a wide range of solubility. They are soluble in most of the common organic solvents as well as in most plasticizers used in the compounding of vinyl halide polymers. They are fully compatible with halogen-containing resins and constitute a new group of stabilizers which have the particular advantage that also the malonic acid ester moiety of itself is completely compatible with the resins and acts as plasticizer, which property is carried over in the malonic ester tin compound. Therefore, these compounds exert both a stabilizing action and a plasticizing action.

The new organo-tin malonic ester compounds having amyl groups and higher groups on the carboxylic groups are well soluble in mineral oils and may be used as additives thereto.

Beta-diketo compounds are compounds wherein a methylene group is activated by two neighboring carbonyl groups. When their alkali metal derivatives are reacted with organo-tin halides, compounds of the following formulae are obtained:

(5)     $R_2Sn(CR'(COR'')_2)_2$ (6)     $R_3SnCR'(COR'')_2$

In these formulae R and R'' are alkyl or aryl and R' is hydrogen, alkyl or aralkyl.

It may be possible that these compounds are better represented by a chelate configuration, in which case their structural formulae should be written as follows:

(5a)

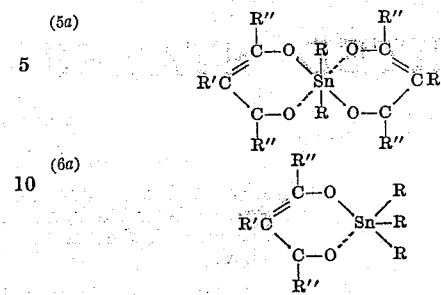

(6a)

Examples of beta diketones are acetylacetone, propionyl acetone, butyroyl acetone, also beta diketones which are mono substituted on the methylene group as 2-methyl acetylacetone, 2-butyl acetylacetone, 2-ethylhexyl acetylacetone, 2-benzyl acetylacetone, aromatic diketones as benzoylacetone, 2-ethyl benzoylacetone, cinnamoylacetone and others.

The reaction products of the beta diketones with organo-tin halides are liquids, which can be distilled under reduced pressure without decomposition and obtained in a pure state. They are stable against hydrolysis and are not decomposed when exposed to moist air. They are soluble in a large number of solvents, also in high boiling esters and hydrocarbons, amides and other compounds used as plasticizers.

A third group of starting materials for the prepartion of the new organo-tin compounds are beta-keto-carboxylic acid derivatives of the formula (7)     $RCOCH_2Z$ wherein R is alkyl or aryl and Z an ester group COOR, an amide group $CONH_2$, or a nitrile group CN. When subjecting these compounds to the reaction with organo-tin halides in the manner set forth hereinbefore, compounds of the following formulae are obtained (8)

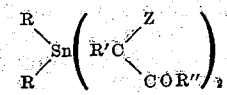

and (9)

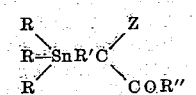

where R and R'' are alkyl or aryl radicals, R' is hydrogen, alkyl, aralkyl, or another radical as obtained through a condensation reaction, and wherein Z represents the same groups as in Formula 7. These compounds may also be represented as chelates in formulae similar to those given for the beta-diketo compounds.

As beta-keto-carboxylic acid derivatives, the following may be used:

1. The alkyl or aralkyl or cyclic derivatives of acetoacetic acid $CH_3COCH_2COOR$ where R stands for methyl, ethyl, propyl, butyl amyl, hexyl, octyl, nonyl, dodecyl, also for benzyl, cyclohexyl, tetrahydrofurfuryl, and others.

2. Beta-keto esters derived from the ester condensation of higher fatty acid esters with an acetic acid ester of the general formula $RCOCH_2COOR'$ where R·CO is the residue from the condensation of, for example, propionic, butyric, hexoic, 2-ethylhexoic, benzoic, and other esters with the esters of acetic acid having an alcohol residue R' which stands for radicals as enumerated above.

3. Beta-keto amides of the following formula:

RCOCH₂CONH₂ such as acetoacetic amide, methyl acetoacetic amide, benzoyl acetoacetic amide, and others.

4. Beta-keto nitriles of the following formula:

RCOCH₂CN such as methyl cyanoacetone, alpha-methyl acetoacetic acid nitrile, benzoyl acetoacetic nitrile, propionyl acetonitrile where R represents an alkyl or aryl radical as enumerated above.

Another group of compounds having an activated methylene group is represented by the sulphones. This large class of organic sulphur compounds may be divided into disulphones, where the active methylene group lies between two SO₂ groups, and in compounds where the methylene group lies between an SO₂ group and another activating group. These second activating groups may be CO, COOR, CONH₂, and CN, and we have accordingly keto sulphones and sulphonyl derivatives of esters, amides, and nitriles.

Examples of such compounds are:

Ethyl methyl sulfonyl acetate
Ethyl phenyl sulfonyl acetate
Phenyl sulfonyl acetonitrile
Para-tolyl sulfonyl acetonitrile
Benzene sulfonyl acetamide
Para-tolyl sulfonyl acetamide
Ethyl sulfonyl acetamide
Phenyl sulfonyl acetone
Para-tolyl sulfonyl acetone
Para-tolyl sulfonyl acetophenone
Di-(methyl-sulfonyl) methane
Di-(ethyl-sulfonyl) methane
Di-(butyl-sulfonyl) methane
Di-(phenyl-sulfonyl) methane The last four compounds may be obtained by the oxidation of the corresponding sulphides.

All these sulfonyl derivatives may be reacted in the described manner with organo-tin halides and form compounds of the following formula

(10)
$$R_nSn-\left[\begin{array}{c}R'\phantom{x}SO_2R''\\|\phantom{xx}/\\C\\\phantom{xx}\backslash\\X\end{array}\right]_m$$

In the formula, R and R'' are the same or different alkyl or aryl groups, R' represents hydrogen, alkyl or aralkyl, and X is a negative constituent such as SO₂R'', COR'', COOR'', CONH₂, or CN. In compounds prepared by condensation with organo-tin dihalides n and m is each 2, in compounds prepared with organo-tin trihalides n is 3 and m is 1.

In the foregoing, compounds have been considered which contain a methylene group neighboring two activating groups. However, these compounds can be reacted with organo-tin halides also when a third activating group has been introduced. Such starting materials have the following configuration:

(11)
$$\begin{array}{c}H\\|\\R'-C-R''\\|\\R'''\end{array}$$

where R', and R'', represent the same or different members of the activating groups COR, COOR, CONH₂, CN, R being alkyl or aryl. R' and/or R'' may also be groups containing olefinic bonds or conjugated double bonds of the benzene nucleus or SO₂R groups, R''' being in this case one of the other activating groups recited hereinbefore.

When reacted with organo-tin halides, the following compounds are formed

(12)        R₂Sn(CR'R''R''')₂ and

(13)        R₃SnCR'R''R''' where R is alkyl or aryl and R', R'', and R''' designate the same groups as in Formula 11.

Other compounds susceptible to the reaction with organo-tin halides are compounds which contain three activating groups in the molecule but where not all three groups are neighboring the methylene groups.

Examples of compounds having three negative groups and being adapted for the reaction with organo-tin halides are the following:

Diacetyl acetic esters
Methylene tricarboxylic esters
Cyano malonic esters
Oxalacetic esters
Acetone oxalic esters
Glutaconic esters
Phenyl malonic esters
Phenyl acetoacetic esters
Benzoyl cyano acetic esters
Phenyl oxalacetic esters
Phenyl cyano pyruvic esters
Benzoyl glutaric esters
Cinnamoyl acetone
Phenyl itaconic esters
Para tolyl sulfonyl para ethyl carboxy phenyl sulfonyl methane
Bis-ethyl-sulfonyl-phenyl methane and others.

The following examples will further illustrate the invention.

*Example 1*

16.2 g. of sodium methoxide were slurried in 300 cc. of toluol and cooled to 10° C. Maintaining this temperature 48 g. of di-ethyl malonate were added under powerful stirring to disperse the sodium derivative of the diethyl malonate which is only slightly soluble in the solvent. This dispersion was cooled to 0° C. and then 45.6 g. of dibutyl tin dichloride dissolved in toluol was added, while maintaining the temperature at 0–5° C., by cooling. After the addition was completed the progress of the reaction was checked by withdrawing samples from the batch and establishing the excess alkali. After the reaction became neutral the salt formed was filtered off and the solvent distilled under reduced pressure; finally the pressure was reduced to 5 mm. and at 95–100° C. all volatile products were distilled out. The remaining liquid product contained 21.15 per cent of tin and corresponded substantially to the dibutyl tin di-(ethyl malonate) which theoretically requires a tin content of 21.54 per cent. At 20° C. the specific gravity of the product was 1.161 and the refractive index 1.4665.

*Example 2*

16.2 g. of sodium methoxide were prepared by dissolving 6.9 g. of sodium metal in an excess of absolute methanol and by distilling out the methanol under reduced pressure. The dry sodium methoxide was slurried in 200 cc. of toluol, and 61 g. of dibutyl malonate having a boiling point of 114° C. at 8 mm. were added under cooling at 10° C. This solution was reacted at 0–5° C. with 45.6 g. of dibutyl tin dichloride dissolved in toluol and the mixture was stirred until it became neutral. The precipitated sodium chloride was filtered off and the toluol removed under reduced pressure; the vacuum distillation was continued at 5 mm. pressure and 120° C. to remove all volatile matter. The liquid product obtained contained 18.3 per cent of tin and corresponded substantially to the dibutyl tin di-(butyl malonate) which theoretically has a tin content of 17.9 per cent. At 20° C. the specific gravity of the compound was 1.1055 and its refractive index 1.4541.

Example 3

10.8 g. of sodium methoxide in 200 cc. of benzene were slowly added to 66 g. of di-2-ethylhexyl malonate having a boiling point of 180° C. at 5 mm. pressure and then reacted with 30.4 g. of dibutyl tin dichloride in benzene at 0–5° C. After the reaction was completed the product was worked up as in the preceding examples. The obtained liquid product contained 12.64 per cent of tin, the specific gravity was 1.0164 and the refractive index 1.4557 at 20° C. It was substantially dibutyl tin di-(ethylhexyl malonate), which has a theoretic tin content of 13.4 per cent.

Example 4

27 g. of sodium methoxide slurried in 400 cc. of toluol were added to 139.2 g. of benzyl diethyl malonate (B. P. 142–145° at 5 mm.). The solution was reacted with 76 g. of dibutyl tin dichloride in toluol at 5–10° C. and the batch stirred until it became neutral. The product obtained after filtering off the salt and distilling out the solvent and volatile matter contained 14.6 per cent of tin and corresponded essentially to a dibutyl tin di-(benzyl ethyl malonate) of the formula

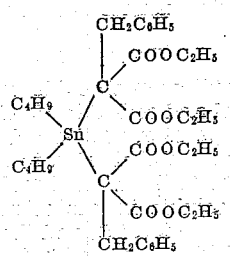

which contains 15.1 per cent of tin.

Example 5

10.8 g. of sodium methoxide were added slowly under stirring and cooling in 150 cc. of toluol to 33.2 g. of methylene bis diethyl malonate, which was obtained by condensing diethyl malonate with formaldehyde in the presence of diethylamine and which boiled at 190–200° C. at 12 mm. pressure (see Organic Syntheses, vol. 1, p. 290). 30.4 g. of dibutyl tin dichloride in toluol were then added at 0–5° C. and the product stirred until it became neutral. On working up the batch as in the previous examples 54 g. of a clear colorless oil were obtained having 18.7 per cent of tin, a specific gravity of 1.1844 and refractive index of 1.4710; it corresponded predominantly to dibutyl tin methylene bis di(ethyl malonate) of the following formula

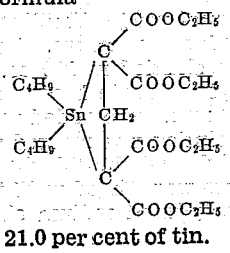

which requires 21.0 per cent of tin.

Example 6

5.4 g. of sodium methoxide were dispersed in toluol and 20.4 g. of dibutyl malonate (B. P. 114° C. at 8 mm.) were added thereto under cooling at 10° C. This mixture was then reacted at 0–5° C. with 32.5 g. of tributyl tin chloride diluted with toluol. After stirring for 3 hours the reaction mixture became neutral and the precipitated sodium chloride was filtered off. After stripping off the solvent and distilling out all volatile components at 1.5 mm. pressure, a colorless oily product was obtained which contained 24.15 per cent of tin and had a specific gravity of 1.0964 and a refractive index of 1.4634 at 20° C.; it corresponded essentially to tributyl tin dibutyl malonate of the following formula

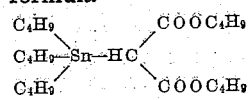

which theoretically requires 24.07 per cent of tin.

Example 7

In an identical manner as in the preceding example 18.8 g. of ethyl diethyl malonate were reacted with 5.4 g. of sodium methoxide in toluol and then 32.5 g. of tributyl tin chloride were added. The product obtained after filtration and stripping contained 26.0 per cent of tin; it had a specific gravity of 1.1170 and a refractive index of 1.4576 and corresponded substantially to the tributyl tin ethyl diethyl malonate of the following formula:

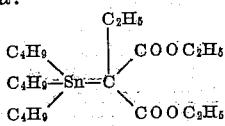

which theoretically requires 24.87 per cent of tin.

Example 8

60.6 g. of pentanedione-2,4 (acetylacetone) were added to 32.8 g. of sodium methoxide dispersed in 600 cc. of toluol under strong stirring and cooling, and stirring was continued until the sodium derivative of the acetylacetone was uniformly dispersed in the solvent. Then 91.2 g. of dibutyl tin dichloride were added to this dispersion under cooling at 10–15° C. Stirring was continued until the mixture was neutral and the salt formed in the reaction settled rapidly. The clear liquid was siphoned off, the residue filtered and then the toluol distilled off under reduced pressure from the combined liquids; the vacuum distillation was continued until all volatile matter was removed at 100° C. at 10 mm. pressure. The slightly yellowish oily product was distilled and boiled at 130–132° C. at 1.6 mm. pressure. The product was dibutyl di(acetyl acetonyl) tin and had the molecular formula $SnC_{12}H_{32}O_4$. Assuming a chelate configuration, it was represented by the structural formula:

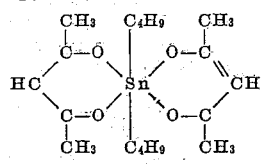

Example 9

4.6 g. of sodium metal sand were prepared under xylol, then 42.4 g. of 3-(2-ethylhexyl) pentanedione 2,4 were added and the mixture was stirred until the sodium had dissolved completely. 30.4 g. of dibutyl tin dichloride were added to this solution under cooling and the mixture was stirred until it became neutral. Then the salt was filtered off and the solvent and all volatile products removed at 5 mm. pressure. The obtained compound was dibutyl di(3,(2-ethyl hexyl) acetyl acetonyl) tin of the structure:

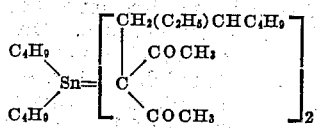

*Example 10*

In an identical procedure as outlined in the preceding example but using 38.0 g. of 3-benzyl pentanedione-2,4 a liquid product was obtained which was dibutyl di(3(benzyl) acetyl acetonyl) tin of the formula:

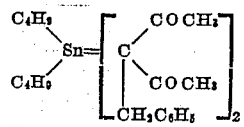

*Example 11*

30 g. of acetylacetone were added under cooling to a dispersion of 16.2 g. of sodium methoxide in 300 cc. of toluol, and the obtained dispersion was cooled to 0° C. 98 g. of tributyl tin monochloride diluted with 100 cc. of toluol were added to this solution, keeping the temperature at 0° C. After stirring the mixture for several hours it was neutral and the precipitated sodium chloride was filtered off. After distilling the solvent and removing all volatile matter at 5 mm. pressure, an oily product was obtained which was tributyl acetyl acetonyl tin of the formula:

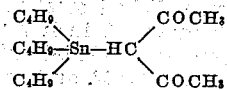

*Example 12*

10.8 g. of sodium methoxide were dispersed in 150 cc. of toluol and 31.6 g. of butyl acetoacetate were added. After cooling the solution to 0° C. 30.4 g. of dibutyl tin dichloride dissolved in 50 cc. of toluol were added while keeping the temperature at 0-5° C. The batch was stirred for three hours until it became neutral, then the salt formed was filtered off and the solvent removed under reduced pressure. The vacuum distillation was then continued at a temperature of 100° C. and a pressure of 5 mm. to eliminate all volatile matter and all unreacted butyl acetoacetate. A liquid product was obtained which contained 20.7 per cent of tin and corresponded essentially to dibutyl di (butyl aceto acetyl) tin of the formula:

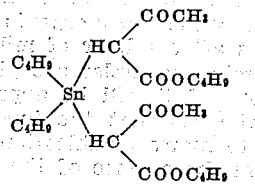

which requires theoretically a tin content of 21.7 per cent. The product could not be fractionated, as it decomposes on distillation.

*Example 13*

4.6 g. of metallic sodium were dissolved in 50 cc. of methanol and the excess methanol distilled out under reduced pressure. Under the exclusion of air and moisture the sodium methoxide so obtained was slurried in 200 cc. of toluol and 26 g. of ethyl acetoacetate were added to this solution and the mixture was stirred well until all sodium methoxide was dissolved. To the solution so obtained 30.4 g. of dibutyl tin dichloride were added under stirring and cooling at 5° C. and the batch was stirred until a test showed no excess alkalinity. The salt was filtered off and the solvent distilled off, and finally the oily residue was stripped of all volatile matter at 100° C. and 5 mm. pressure. The obtained product was essentially dibutyl di (ethyl aceto acetyl) tin of the formula:

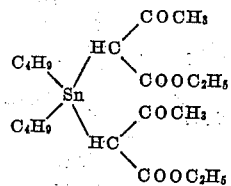

*Example 14*

9.2 g. of metallic sodium sand were prepared under xylol and added to 76.4 g. of ethyl benzoyl acetate; the mixture was stirred until the sodium dissolved. Then 60.8 g. of dibutyl tin dichloride dissolved in xylol were added to this solution under cooling and the batch was stirred until it was neutral. The product was worked up as described in the preceding example. The final product was a dibutyl di (ethyl benzoyl acetyl) tin of the formula:

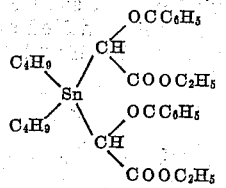

*Example 15*

In an analogous manner as described in the previous example, but using 9.2 g. of sodium metal, 74.6 g. of ethyl butyl acetoacetate and 60.8 g. of dibutyl tin dichloride, a product was obtained which was dibutyl di (2 butyl ethyl aceto acetyl) tin of the formula:

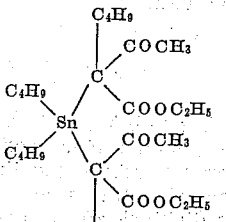

*Example 16*

27 g. of sodium methoxide and 92 g. of methyl amyl acetoacetate of the formula:

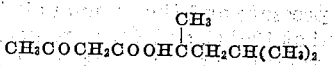

were reacted as described in Example 12, 162.75 g. of tributyl tin monochloride were added to this solution and the resulting solution was worked up as described hereinbefore whereby a liquid product was obtained, which was tributyl methyl amyl aceto acetyl tin of the formula:

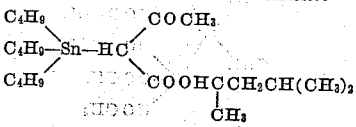

Example 17

21.6 g. of sodium methoxide and 33.2 g. of methyl cyano acetate dispersed in toluene were allowed to react with 60.8 g. of dibutyl tin dichloride. After the mixture had become neutral, the precipitated salt was filtered off and the solvent was evaporated at reduced pressure; then the pressure was further reduced to 5 mm. in order to distill out all volatile matter and unreacted methyl cyano acetate. The yellow colored oily end product consisted largely of dibutyl di (methyl cyano acetyl) tin of the formula:

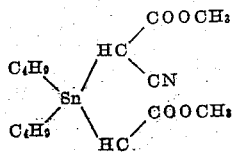

Example 18

50 g. of phenyl sulfonyl acetone which was easily prepared by reacting sodium benzene sulfinate and monochloracetone and had a melting point of 57° C. was dissolved in 250 cc. of benzene to a clear solution to which were added, first, 13.5 g. of sodium methoxide and after cooling to 5° C., 38 g. of dibutyl tin dichloride dissolved in a little benzene. After stirring for several hours the reaction was neutral. The salt formed during the reaction was filtered and then the benzene was distilled off. A solid crystalline product was obtained which melted at 85–87° C. and was dibutyl di (phenyl sulfonyl acetonyl) tin of the formula:

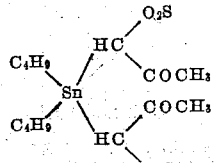

Example 19

21.6 g. of sodium methoxide were slurried in 250 cc. of dry toluol, and 69 g. of ethyl diacetyl acetate of the formula:

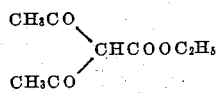

having a boiling point of 95–97° C. at 12 mm. pressure were added under cooling at 10° C. to this suspension, whereby the sodium derivative of the ethyl diacetylacetate was obtained. 60.8 g. of dibutyl tin dichloride were dissolved in toluol and added to the first solution under vigorous mixing and cooling; mixing was continued until the mixture had become neutral. The salt was then filtered off and the toluol removed under reduced pressure and the vacuum distillation was continued at 100° C. and 5 mm. pressure to eliminate all volatile matter. The liquid product so obtained was analyzed and proved to be dibutyl di (3 carboxy ethyl acetyl acetonyl) tin of the formula

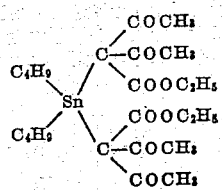

Example 20

45 g. of indene were dissolved in 100 cc. of xylol and 4.6 g. of sodium metal were added to this solution. Then dry ammonia gas was introduced for 6 hours at 125–130° C. until all sodium was dissolved. The ammonia was then eliminated by blowing nitrogen gas at 100–120° C. through the reaction mixture. On cooling the indene-sodium compound separated out as a solid, covered with xylol. 65.1 g. of tributyl tin monochloride were added to this mixture and the batch was stirred and heated until a sample showed a neutral reaction. The product was worked up in the usual manner by filtering off the sodium chloride and then removing the xylol and excess indene by fractional distillation. The remaining oily product corresponded to the formula:

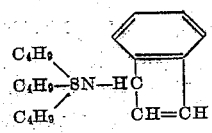

The use of the new compounds as stabilizers for halogen-containing resins is illustrated by the following examples:

Example 21

0.5 g. of dibutyl tin di (ethyl malonate) as obtained in Example 1 were dissolved in 34.5 g. of di-2-ethyl-hexyl phthalate and this solution was mixed with 65 g. of a vinyl chloride-vinyl acetate copolymer resin containing 95 per cent vinyl chloride and 5 per cent vinyl acetate. The mixture was then milled on a rubber mill at 325° F. until a uniformly fluxed film was obtained. This film was then heat-pressed at 325° F. between polished steel plates to a film of 40 mm. thickness. 1 inch by 2 inch strips of this film were then heat-treated in an air-circulating oven at 325° F. and the color change compared with an identical film containing no stabilizer. After 1 hour and 15 minutes the stabilized film was very slightly yellow whereas the unstabilized film was brown already after 10 minutes.

Example 22

1 g. of dibutyl di acetyl-acetonyl tin as obtained according to Example 8 was mixed with 100 g. of a vinyl chloride resin and 49 g. of di 2-ethyl hexyl phthalate and the mixture was continuously milled on a rubber mill at 325° F. for 1 hour. Samples were removed every 5 minutes and the color change was compared with an identical resin mixture containing no stabilizer and milled on the same mill under identical conditions. The unstabilized mixture was reddish brown after 15 minutes whereas the mixture containing the above organic tin compound was colorless after 1 hour of milling.

The foregoing examples are given for illustration only and it will be apparent to those skilled in the art that the invention will be susceptible to many modifications without departing from the essence of the invention and all such variations are intended to be included within the scope of the appended claims.

What we claim is:

1. Organo-tin compounds wherein a tetravalent tin atom is linked with each of its four valences to a carbon atom, at least two and not more than three of said carbon atoms being part of a radical selected from the group consisting of alkyl and aryl, and the rest of said carbon atoms being each linked to at least two negative groups, at least one of which is a member selected from the group consisting of COR, COOR, CONH₂, CONHR, CN, and SO₂R, where R is a member of the group consisting of alkyl and aryl.

2. Organo-tin compounds of the formula:

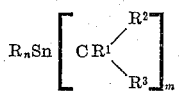

where R is a member of the group consisting of alkyl and aryl, R' is a member selected from the group consisting of hydrogen, alkyl and aralkyl, R² and R³ are negative radicals directly linked to the carbon atom and selected from the group consisting of COR, COOR, CONH₂, CONHR, and SO₂R, R being a member of the group consisting of alkyl and aryl, and wherein $n+m$ is 4, $n$ being at least 2 and not higher than 3.

3. Organo-tin malonic ester compounds of the formula:

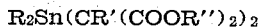

wherein R is a member selected from the group consisting of alkyl and aryl, R' represents a member selected from the group consisting of hydrogen, alkyl and aralkyl, and where COOR'' is an esterified carboxylic group.

4. Organo-tin malonic ester compounds of the formula

wherein R is a member selected from the group consisting of alkyl and aryl, R' represents a member selected from the group consisting of hydrogen, alkyl and aralkyl, and where COOR'' is an esterified carboxylic group.

5. Organo-tin malonic ester compounds of the formula

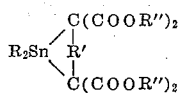

where R is a member selected from the group consisting of alkyl and aryl, R' is a member of the group consisting of alkylene and arylene, and COOR'' is an esterified carboxylic group.

6. Organo-tin beta-diketo compounds of the formula:

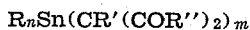

wherein R and R'' are members selected from the group consisting of alkyl and aryl, R' is a member selected from the group consisting of hydrogen, alkyl and aralkyl, and wherein $n+m$ is 4, $n$ being at least 2 and not higher than 3.

7. Organo-tin beta-keto carboxylic acid compounds of the formula

wherein R and R'' are members of the group consisting of alkyl and aryl, R' is a member selected from the group consisting of hydrogen, alkyl, alkylene and aralkyl, Z represents a modified carboxylic acid group selected from the group consisting of ester, amide, and nitrile, and wherein $n+m$ is 4, $n$ being at least 2 and not higher than 3.

8. Organo-tin sulfone compounds of the formula

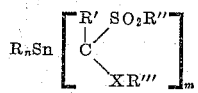

wherein R, R'', and R''' are members selected from the group consisting of alkyl and aryl, R' represents a member selected from the group consisting of hydrogen, alkyl and aralkyl, XR''' is a negative constituent selected from the group consisting of SO₂R''', COR''', COOR''', CONH₂, CONHR''', and CN, and wherein $n+m$ is 4, $n$ being at least 2 and not higher than 3.

9. Organo-tin compounds wherein a tetravalent tin atom is linked with each of its four valences to a carbon atom, at least two and not more than three of said carbon atoms being part of a radical selected from the group consisting of alkyl and aryl, and the rest of said carbon atoms being each linked to at least one negative radical selected from the group consisting of COR, COOR, CONH₂, CONHR, and SO₂R, where R is a member of the group consisting of alkyl and aryl, and to at least one double bond hydrocarbon ring.

10. A process of preparing organo-tin compounds comprising the steps of reacting in an anhydrous organic solvent in the presence of an alkaline condensing agent an organo-tin halide with an organic compound having an activated methylene group, and removing the precipitated alkali halide and the solvent.

GERRY P. MACK.
EMERY PARKER.

REFERENCES CITED

The following references are of record in the file of this patent:

UNITED STATES PATENTS

| Number | Name | Date |
|---|---|---|
| 2,253,128 | Langkammer et al. | Aug. 19, 1941 |
| 2,259,063 | Davis | Oct. 14, 1941 |
| 2,272,133 | Shappirio | Feb. 3, 1942 |
| 2,278,965 | Van Peski et al. | Apr. 7, 1942 |
| 2,455,613 | Schlattman | Dec. 7, 1948 |
| 2,479,918 | Fincke et al. | Aug. 23, 1949 |

OTHER REFERENCES

Morgan et al.: Chemical Soc. Jour. (London), vol. 125, Jan.–June 1924, pages 372–381.